P. K. DEDERICK.
Baling-Presses.
No. 213,280. Patented Mar. 18, 1879.
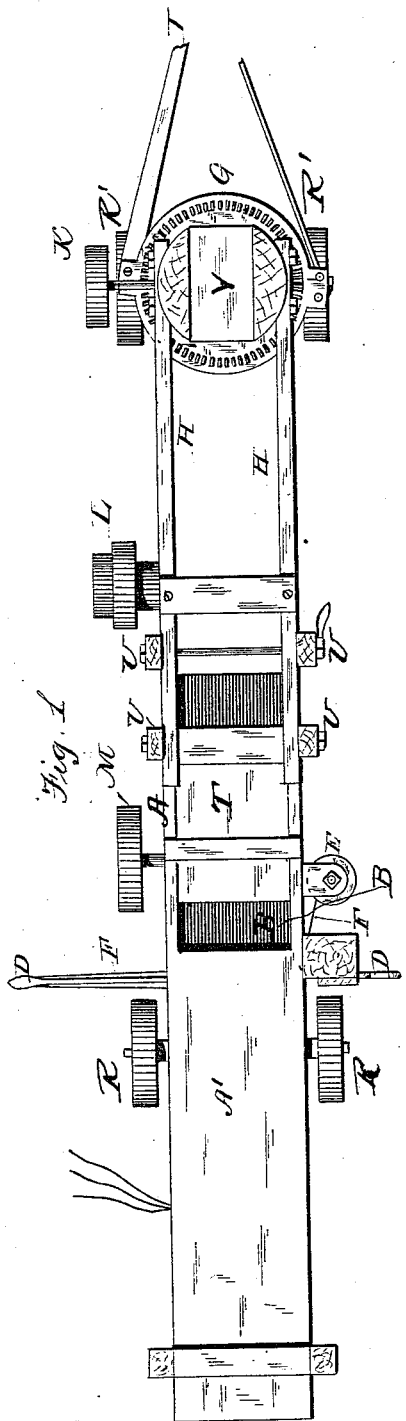
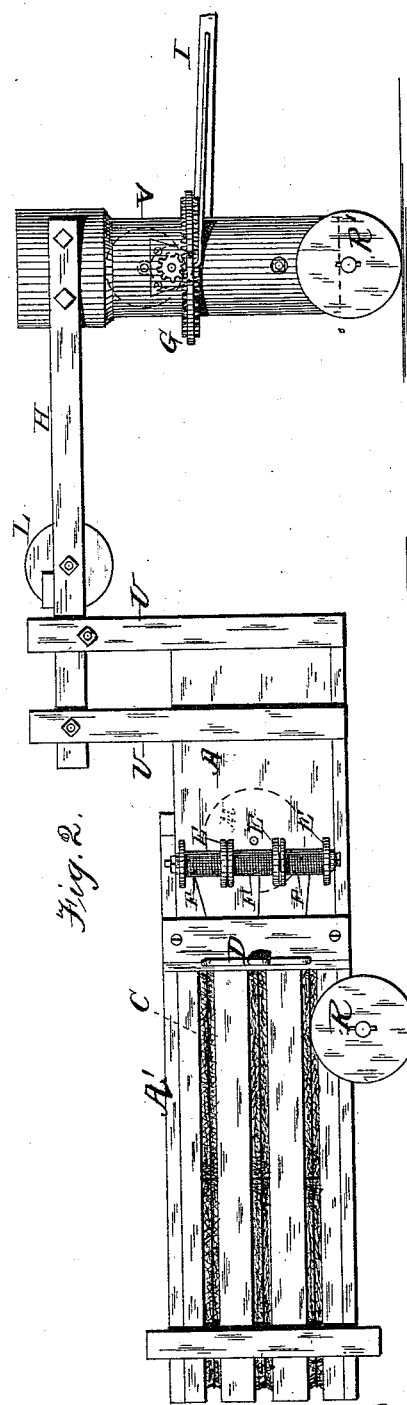
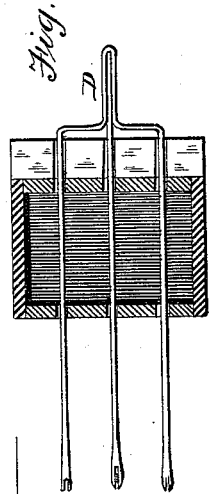

UNITED STATES PATENT OFFICE.

PETER K. DEDERICK, OF ALBANY, NEW YORK.

IMPROVEMENT IN BALING-PRESSES.

Specification forming part of Letters Patent No. 213,280, dated March 18, 1879; application filed June 1, 1878.

*To all whom it may concern:*

Be it known that I, PETER K. DEDERICK, of Albany, Albany county, New York, have invented certain new and useful Improvements in Baling-Presses; and I do hereby declare the following to be a full and exact description of the same, reference being had to the accompanying drawings, forming part of this specification, in which—

Figure 1 represents a top-plan view of a continuously-operating baling-press with my improvements applied thereto; Fig. 2, a side elevation of the same; and Fig. 3, a transverse section, showing the device for passing the binding material between the bales.

Similar letters of reference in the several figures denote the same parts.

This invention relates more particularly to improvements in that class of baling-presses in which the operations of forming, binding, and ejecting the bales are performed simultaneously and without interruption, and for which numerous Letters Patent have been heretofore granted me.

The invention consists in improved means for holding and manipulating the binding material, whereby the tying-off operation is greatly facilitated, substantially as I will now proceed to describe.

In the press represented in the drawings, A is the press-box, B the feed-orifice, A' the bale-chamber, C the tying-slots, and T the reciprocating traverser, all of the usual construction.

To enable the press and the power by which it is operated to be transported from place to place together, the forward end of the press is provided with uprights U, which are connected by timbers H to an upright, V, carrying the power G I, and the whole structure is supported upon wheels R R'.

The connecting-timbers H are so arranged that the horses attached to the lever I of the power can readily pass under them when the press is in operation.

Motion is communicated from the power to the traverser by means of pulleys K L M and a suitable connecting belt or belts, as will be readily understood.

The wires or other material for binding the bales are coiled upon a series of reels, E E E, located at the side of the press-box opposite the tying-slots, so that said wires F F F will be in convenient position for being passed through the press.

The wires may be passed one at a time by any suitable device, though I prefer to pass them all simultaneously by means of a three-bladed needle or carrier, D, arranged at the side of the press, with its blades in line with the tying-slots, as shown.

The manner of tying off the bales is as follows: The ends of the wires are first inserted in grooves or eyes in the extremities of the needle-blades, and the latter are passed through the tying-slots and out of the press on the opposite side. The needle is then withdrawn, leaving the wires in position. As the bale forms and is forced along in the bale-chamber, the wires are farther unwound from the reels and drawn along the side of the bale past the needle; and when the bale is completed the needle is again forced through, this time carrying with it the doubled wires, and is then again withdrawn. A new bale then forms against the doubled wires, and the latter are cut apart, one portion being lapped over the completed bale and tied to the previously-passed ends, and the other portions lapped on the forming bale for connection with the severed ends of the next doubled wires. The tying off of the bales is thus greatly facilitated, as the opposite ends of two sets of ties are passed at each introduction of the needle.

The reels are preferably separated by loose washers, and the shaft upon which they are mounted is provided with adjusting-nuts, by which they may be impinged and made to opperate together. If desired, however, the reels may be separated by a fixed washer, so as to insure their independent action.

In order to reduce friction and render the operation of passing the ties less difficult, the ends of the needle-blades, as well as the bearing-points of the wires at the extremities of the tying-slots, may be provided with friction-rollers; or the wires may be drawn from the reels and folded on the ends of the blades at the proper point, and the blades then forced through, as will be readily understood.

The needle may also be arranged to draw the wires through from the opposite side of the press instead of forcing them through in advance.

I do not claim herein the method of tying off bales by passing the bights of the binding-wires through the material at suitable intervals to separate the material into bales, and subsequently cutting the said bights and using one portion to secure the finished bale, and the other portion to secure the forming or succeeding bale, as such method is described in the patent of John Howell, dated February 1, 1879, No. 212,227.

Having thus fully described my invention, I claim and desire to secure by Letters Patent—

1. The combination of the slotted press-case, reels, or spools for carrying the binding material, and means for passing the binding material between the bales, substantially as described.

2. The combination, with the slotted press-case A, of the reels E E, mounted on the side of the press, and the device D, for passing the doubled wire through the press-box, substantially as described.

P. K. DEDERICK.

Witnesses:
A. M. DEDERICK,
C. R. DEDERICK.